US008681244B2

(12) United States Patent
Lee et al.

(10) Patent No.: US 8,681,244 B2
(45) Date of Patent: Mar. 25, 2014

(54) IMAGE PROCESSING METHOD USING BLURRING AND PHOTOGRAPHING APPARATUS USING THE SAME

(75) Inventors: Jin-Kyung Lee, Suwon-si (KR); Tae-Kyung Kim, Seoul (KR); Taek-Seong Jeong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 341 days.

(21) Appl. No.: 13/049,558

(22) Filed: Mar. 16, 2011

(65) Prior Publication Data

US 2011/0242367 A1 Oct. 6, 2011

(30) Foreign Application Priority Data

Mar. 31, 2010 (KR) ........................ 10-2010-0029362

(51) Int. Cl.
*H04N 9/68* (2006.01)
*H04N 5/228* (2006.01)

(52) U.S. Cl.
USPC ........................................ 348/234; 348/222.1

(58) Field of Classification Search
USPC ........ 348/222.1, 229.1, 230.1, 234, 241, 252; 382/264
See application file for complete search history.

(56) References Cited

U.S. PATENT DOCUMENTS

| 7,173,732 | B2* | 2/2007 | Matama ........................ 358/1.9 |
| 7,990,429 | B2* | 8/2011 | Saito ........................ 348/222.1 |
| 8,131,104 | B2* | 3/2012 | Arici et al. .................... 382/268 |
| 8,160,381 | B2* | 4/2012 | Ovsiannikov ................ 382/261 |
| 8,306,349 | B2* | 11/2012 | Liu .............................. 382/254 |
| 8,391,629 | B2* | 3/2013 | Ovsiannikov ................ 382/261 |
| 2002/0176113 | A1* | 11/2002 | Edgar .......................... 358/3.27 |
| 2008/0043262 | A1* | 2/2008 | Ovsiannikov ................ 358/1.9 |
| 2008/0056607 | A1* | 3/2008 | Ovsiannikov ................ 382/275 |
| 2008/0085061 | A1* | 4/2008 | Arici et al. .................... 382/268 |
| 2009/0096897 | A1* | 4/2009 | Saito ........................... 348/241 |
| 2009/0129696 | A1* | 5/2009 | Komatsu et al. .............. 382/264 |
| 2009/0284613 | A1 | 11/2009 | Kim |
| 2011/0273577 | A1* | 11/2011 | Saito ........................ 348/222.1 |

FOREIGN PATENT DOCUMENTS

| GB | 2460148 | 8/2012 |
| KR | 1020090014864 | 2/2009 |
| KR | 1020090120314 | 11/2009 |

* cited by examiner

*Primary Examiner* — Nicholas Giles
(74) *Attorney, Agent, or Firm* — The Farrell Law Firm, P.C.

(57) ABSTRACT

An image processing method and a photography apparatus using the same are provided. The image processing method includes inputting at least one image; selecting a specific region of the at least one image input; extracting a luminance value of the selected specific region; and determining a blurring degree based on the extracted luminance value and performing image processing by blurring the selected specific region using the determined blurring degree.

22 Claims, 10 Drawing Sheets

IMAGE PROCESSING METHOD USING BLURRING AND PHOTOGRAPHING APPARATUS USING THE SAME

CROSS-REFERENCE TO RELATED APPLICATIONS

This application claims priority from Korean Patent Application No. 10-2010-0029362, filed on Mar. 31, 2010, in the Korean Intellectual Property Office, the disclosure of which is incorporated herein by reference in its entirety.

BACKGROUND OF THE INVENTION

1. Field of the Invention

The present invention relates to an image processing method and a photography apparatus using the same, and more particularly, to an image processing method capable of realizing an out focus effect and a photography apparatus using the same.

2. Description of the Related Art

Photography apparatuses for photographing an image has been limited to cameras or camcorders in the past. Recently, photography capability has been added to various apparatuses including mobile phones and portable computers. Such photography apparatuses have more improved and diverse functions so that it was possible to photograph an image close to reality and provide various effects by image-processing the photographed image. For example, it was possible to realize various filter effect as well as a pan focus or out focus effect by processing photographed images.

Herein, the out focus effect is obtained when a background image, out of the depth of field (DOF), is blurred. A main subject may be positioned within the DOF and a background may be positioned out of the DOF to be blurred using the out focus effect, thereby enhancing the main subject.

The out focus effect may be realized by an optical method via controlling a focus length and an iris or blurring a background by an image processing. However, a method of blur the background by an image processing divides the subject and the background and image-processes only the background.

BRIEF DESCRIPTION OF THE DRAWINGS

Various features, aspects and benefits of the embodiments of the invention will become apparent and more readily appreciated from the following description of the embodiments, taken in conjunction with the accompanying drawings, of which.

DETAILED DESCRIPTION OF SEVERAL EMBODIMENTS

Certain embodiments of the present invention will now be described in greater detail with reference to the accompanying drawings.

In the following description, same drawing reference numerals are used for the same elements even in different drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

Figure 1:
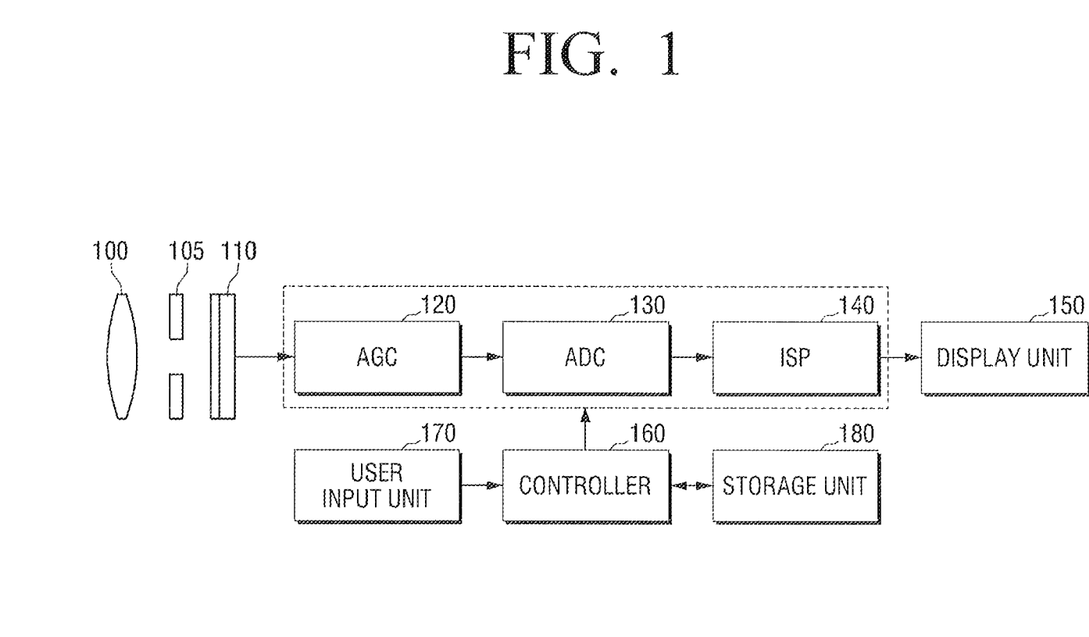
FIG. 1 illustrates a configuration of a camera capable of applying the present invention.

FIG. 1 illustrates a configuration of a camera capable of applying the present invention. According to an embodiment of the present invention, the camera may include a lens 100, a shutter 105, an image sensor 110, an automatic gain control (AGC) circuit 120, an analog to digital converter (ADC) circuit 130, an image signal processor (ISP) 140, a display unit 150, a controller 160, a user input unit 170, and a storage unit 180.

The lens 100 may receives an image of a subject and the shutter 105 may control an amount of light to the image sensor 110. The image sensor 110 may convert an input optical signal into an electrical signal or have a function to control an amount of exposure via an electronic front curtain function.

After the input optical signal may be converted into the electrical signal by the image sensor 110, the electrical signal may be amplified to an appropriate intensity by the AGC circuit 120. The amplified signal may be converted from an analog signal into a digital signal via the ADC circuit 130.

Hereafter, a digital signal processing procedure may be performed in the ISP 140. The ISP 140 may perform an image processing to display a received image signal.

In addition, the ISP 140 may diversely process the input image based on a user's input. In particular, in out focus processing, the ISP 140 may select a specific region of the input image and blur the selected region to realize an out focus effect. In blur processing, the ISP 140 may extract a luminance value of pixels in the specific region and reflect a weight value based on the luminance value to blur the selected region so that it is possible to realize a more natural out focus effect.

The display unit 150 may display an image signal processed by the ISP 140 to be immediately confirmed by a user. In addition, the display unit 150 may generate an on screen display (OSD) to accommodate a convenient control arrangement for a user.

The controller 160 may control overall operation such as amplification, conversion, and processing of a signal. The controller 160 may receive a user's command input from the user input unit 170 and control a camera module based on the received command.

The storage unit 180 may serve as a storage space which stores a current image or an image processed by the ISP 140 as well as a storage space which stores information required to control the photography apparatus.

FIG. 1 exemplifies a digital camera as the photography apparatus. The shutter 105 may be a focal plane shutter disposed prior to the image sensor 110. However, if the shutter has a lens structure capable of photographing a subject, it may be a lens shutter. Moreover, the storage unit 180 may be included within the camera, but the storage unit 180 may be alternatively an external storage medium interconnected with the camera.

Figure 2:
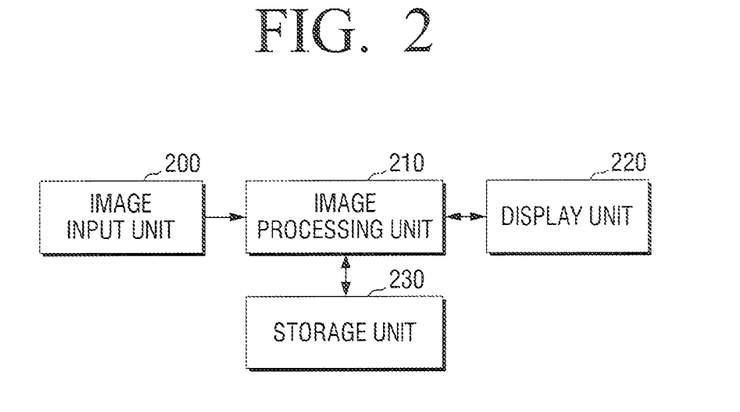
FIG. 2 illustrates a configuration of an image processing apparatus capable of applying the present invention.

FIG. 2 illustrates a configuration of an image processing apparatus capable of applying the present invention. An image processing apparatus according to an embodiment of the present invention may include an image input unit 200, an image processing unit 210, a display unit 220 and a storage unit 230.

The image input unit 200 may receive at least one image. In case of a two dimensional (2D) image, one image may be required to process an image. However, in case of a three dimensional (3D) image constituting of a left eye image and a right eye image, it may be desirable to process at least two images.

The image processing unit 210 may receive an image from the image input unit 200 and process the image. Therefore, it is possible to realize a pan focus effect or various filter effects and extend a dynamic area to obtain an image of good quality.

For example, blur processing may be applied to the image received from the image input unit 200 so as to realize an out focus effect. A blurring effect may be applied based on a luminance value of the received image so as to realize a blurring effect close to reality.

More specifically, for a 2D image, a region of the received image which is to be processed, that is, to be provided with the blurring effect, may be selected. The selection may be performed by a user or by using position information of a subject or distance information of a background within the received image. A luminance value of each pixel of the received image may be extracted. The luminance value may be defined by the following equation, but the luminance value may be defined by various methods.

$$\text{Luminance value} = a*R + b*G + c*B \text{ (Herein, } a, b, \text{ and } c \text{ are real numbers and } R, G \text{ and } B \text{ are luminance values of color components of the image.)}$$

If the extracted luminance value is large, a blurring degree may be increased to provide the blurring effect. If the extracted luminance value is small, a blurring degree may be decreased to provide the blurring effect. That is, the blurring effect is provided base on a weighting value related to the luminance value so that the blurring effect closer to reality can be obtained. Here, the blurring effect close to reality may be referred to as a processing capable of realizing an out focus effect naturally accomplished by the optical method.

Similarly, for a 3D image, the image input unit 200 may receive at least two images. At this time, a region to which the blurring effect is to be applied may be selected and the blurring effect may be applied to the left eye image and the right eye image as described above so that the 3D image also has the out focus effect close to reality.

The image processed by the image processing unit 210 may be transmitted to the display unit 220 and the display unit 220 may display the received image. At this time, the display unit 220 may display an image before image processing so that the region to be blurred may be selected by a user.

In addition, the display unit 220 may display the image to which the blurring effect is applied in the selected region.

The storage unit 230 may temporarily store the received image and/or the processed image. The storage unit 230 may store various kinds of information involved in an operation of the image processing apparatus and provide sources required to an image processing.

Figure 3A:
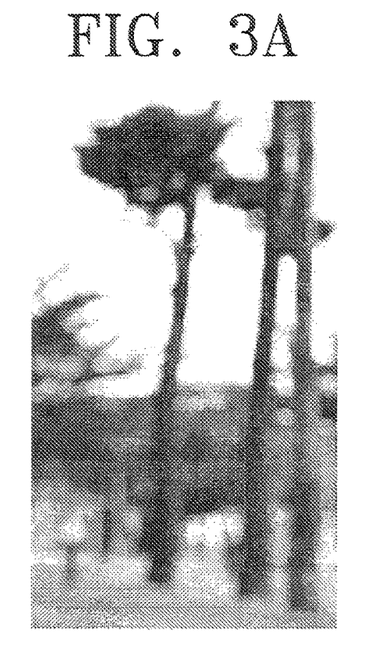
FIGS. 3A to 3C illustrate an image processing method according to an embodiment of the present invention.
Figure 3B:
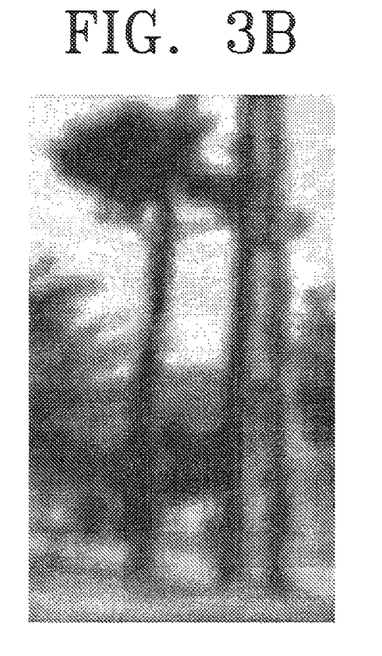
Figure 3C:
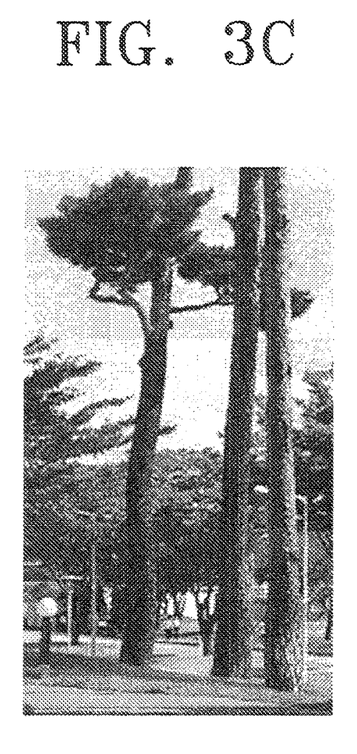

FIGS. 3A to 3C illustrate photographs explaining an image processing method according to an embodiment of the present invention. FIG. 3C illustrates a normal photograph to which the out focus effect is not applied. FIG. 3A illustrate an image naturally out focused by a digital single-lens reflex (DSLR) camera and FIG. 3B is an image to which the out focus effect is created using a blur processing method of the related art.

When the normal image of FIG. 3C is entirely out focused using the optical method, the overall image is naturally blurred as shown in FIG. 3A. As illustrated in the photograph of FIG. 3A, a thickness of a tree trunk which is a subject of the image becomes thinner in the blurred image. In FIG. 3B using the blurring processing method of the related art, a thickness of the tree trunk becomes thicker in the blurred image so that the entire image becomes dull and blurred.

The leaves of the tree illustrate a good Bokeh effect in FIG. 3A, but in FIG. 3B the Bokeh effect is poor because the image appears monotonous and flat.

The image processing method according to an embodiment improves the blur processing method of the related art as shown in FIG. 3B and can realize a more natural image like the out focus effect of a DSLR camera as shown in FIG. 3A. Hereinafter, the image processing method will be described in further detail.

Figure 4:
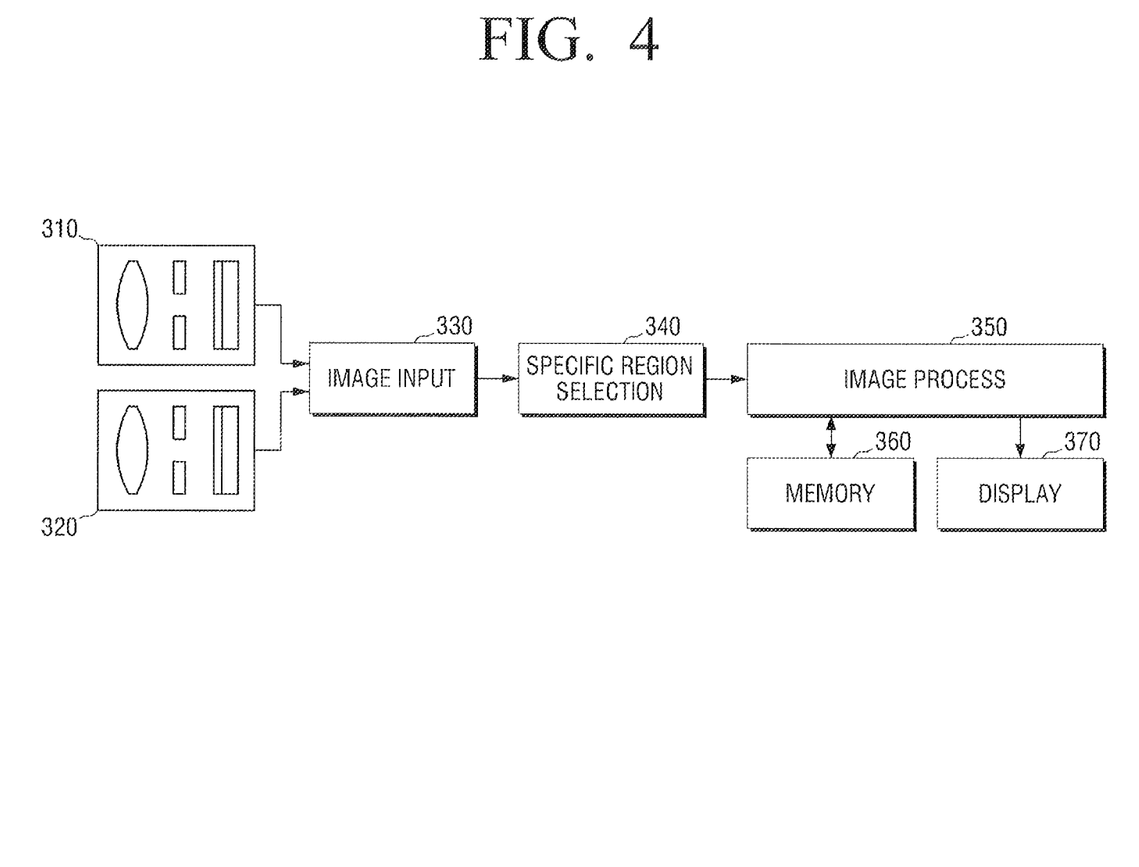
FIG. 4 illustrates an image processing method according to an embodiment of the present invention.

FIG. 4 illustrates an image processing method of the present invention. Camera modules 310 and 320 which obtain at least one image are provided. The camera modules 310 and 320 provide a left eye image and a right eye image for a 3D image. There is no need for two image generating units, but one or any number of image generating units may be employed. The camera module may be an entire configuration of a camera or may be only a lens portion of a camera.

At least one image is input to be processed 330. A specific region of the input image is selected for processing 340. The specific region is referred to as a region in which an out focus effect is to be realized, that is, a region to be blurred and may be selected by a user or by using position information of a subject or distance information of a background within the image.

Once the specific region is selected, image processing is performed 350. At this time, when blurring the selected region, a luminance value of a corresponding pixel is extracted and the corresponding cell is blurred based on a weight value related to the luminance value. That is, when the luminance value of the corresponding pixel is large, a blurring degree is increased. When the luminance value of the corresponding pixel is small, a blurring degree is decreased so that a natural blurring effect occurs.

When performing blur processing using the weight value related to the luminance value as described above, it is possible to obtain a natural image as shown in FIG. 3A. The blurring principle will be described below with reference to FIG. 5.

The processed image may be stored in a memory 360 or be displayed on the display unit 370.

Figure 5:
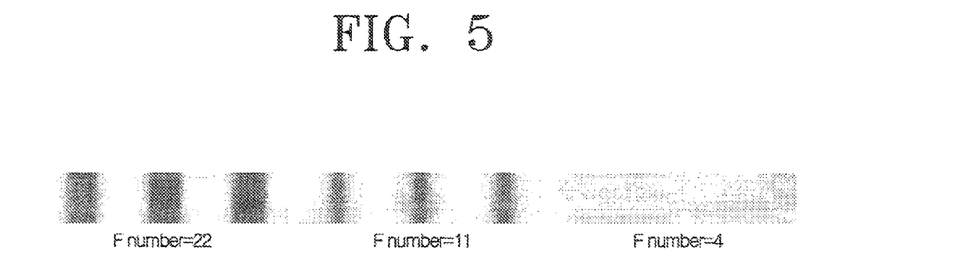
FIG. 5 illustrates an image of a contrast pattern for several numerical aperture values in a digital single-lens reflex (DSLR) camera.
Figure 6:
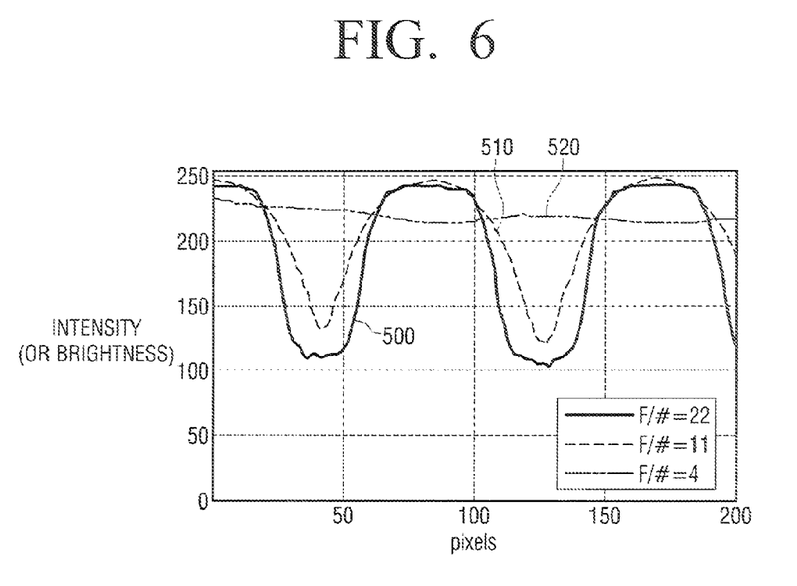
FIG. 6 illustrates a graph indicating an intensity of a contrast pattern over a range of pixels for several numerical aperture values in DSLR camera.

FIG. 5 illustrates an image of a contrast pattern for several a numerical aperture values in a DSLR camera. FIG. 6 illustrates a graph showing the intensity of the contrast pattern for these numerical aperture values in a DSLR camera.

In FIG. 5, when the numerical aperture is 22, the contrast pattern is not significantly blurred. However, when the numerical aperture is 11, the contrast pattern is blurred to a certain degree and a width of each of the dark portions of the contrast pattern becomes reduced. When the numerical aperture is 4, the contrast pattern are largely blurred and a width of each of the dark portions in the contrast pattern is hardly visible. That is, so as to obtain a preferable out focused image as shown in FIG. 3A, bright portions of the contrast pattern may be more blurred, thereby reducing a width of each of the dark portions. In other words, the blurring process described herein relatively increases a blurring degree in the bright portions and it relatively reduces a blurring degree in the dark portions so that blurred bright portions spread into dark portions of the image.

FIG. 6 illustrates a graph showing brightness values over a range of pixels for several numerical aperture values. As shown in FIG. 6, when the numerical aperture is 22 (500), an area occupied by bright portions is mostly similar to an area occupied by dark portions. However, when the numerical aperture is 11 (510), an area occupied by dark portions is further reduced. When the numerical aperture is 4 (520), there is almost no area occupied by dark portions. Reduction in the numerical aperture corresponds to an increase in an out focus degree. Accordingly, the larger the out focus degree is, that is, the larger the blurring degree is, an area of the dark portions become relatively reduced and an area of the bright portions become relatively increased.

Figure 7:
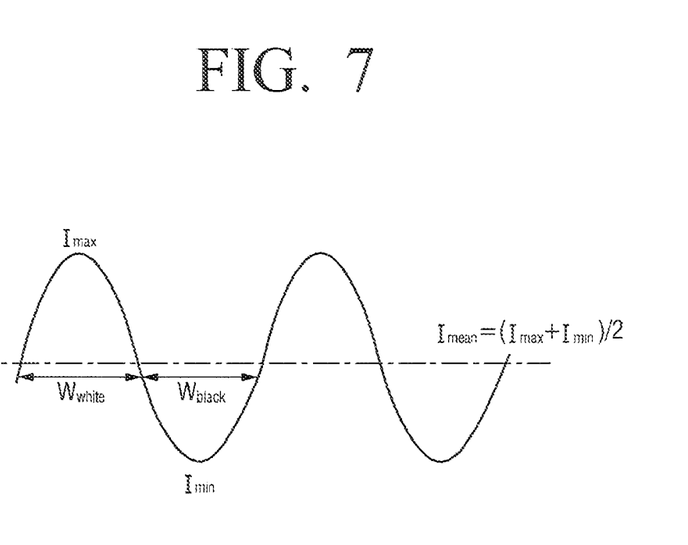
FIG. 7 illustrates a graph explaining an image processing method according to an embodiment of the present invention.

FIG. 7 illustrates a graph generalizing and explaining the out focus characteristic in a DSLR camera. If it is assumed that dark regions and bright regions are distinctly separated and a contrast pattern includes dark regions having the same size as bright regions, a curve having a constant spacing and constant amplitude may be obtained as shown in FIG. 7. $I_{max}$ denotes a value at the brightest, and $I_{min}$ denotes a value at the least bright, that is, at the darkest. $W_{white}$ denotes an area (width) of each of the bright portions, and $W_{black}$ denotes an area (width) of each of the dark portions. $I_{mean}$ denotes a mean brightness, that is a mean value of $I_{max}$ and $I_{min}$.

As described in FIG. 6, the out focus characteristic of a DSLR camera may be explained that a contrast width ratio $W_{white-ip}/W_{black-ip}$ after image processing is increased on the basis of a contrast width ratio $W_{white}/W_{black}$ before image processing.

That is, the blurring degree will be expressed by the following equation.

$$blur = \frac{\frac{W_{white-ip}}{W_{black-ip}}}{\frac{W_{white}}{W_{black}}}$$

Referring to the graph of FIG. 6, a case where the numerical aperture is 22 (500) is regarded as an image before processing and a case where the numerical aperture is 11 (510) is regarded as an image after processing. A blurring degree (blur) of about 1.9 is obtained.

On the other hand, if the blurring is applied regardless of the luminance value, blur of about 0.87 is obtained. Accordingly, blur which is greater than 1 may cause an out focus effect similar to a DSLR camera.

Figure 8:
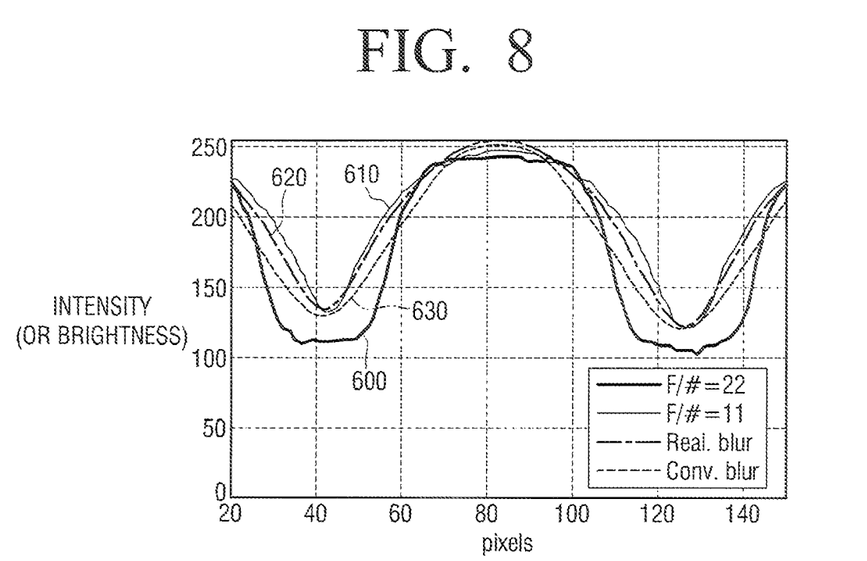
FIG. 8 illustrates a graph explaining an image processing method according to an embodiment of the present invention.

FIG. 8 illustrates comparison of a contrast width ratio for several numerical aperture values of a DSLR camera, a contrast width ratio according to the prior blurring effect and a contrast width ratio according to the blurring effect described herein.

When the blurring effect as described herein is applied, a shape of an iris and a blurring degree according to a distance as well as luminance of a pixel, that is, brightness of a pixel, are considered differently from the related art. Herein, the luminance value may be calculated by multiplying a specific real number to a RGB value described above.

That is, the luminance value may be expressed as $a*R+b*G+c*B$.

On the basis of the luminance value calculated by the above equation, if the luminance value is large, the blurring degree may be increased and if the luminance value is small, the blurring degree may be decreased so that a more natural out focus effect may be realized.

As shown in FIG. 8, it is understood that the contrast width ratio in the case where the numerical aperture is 11 (610) is larger than that in the case where the numerical aperture is 22 (600) in a DSLR camera. In addition, when the numerical aperture is 22 (600) in a DSLR camera, the contrast width ratio in the blurring (620) as described herein is larger than the blurring (630) of the related art and is mostly similar to the blurring (610) in the case where the numerical aperture of a DSLR camera is 11. Therefore, an image which is mostly similar to an image photographed in a DSLR camera can be obtained.

Figure 9:
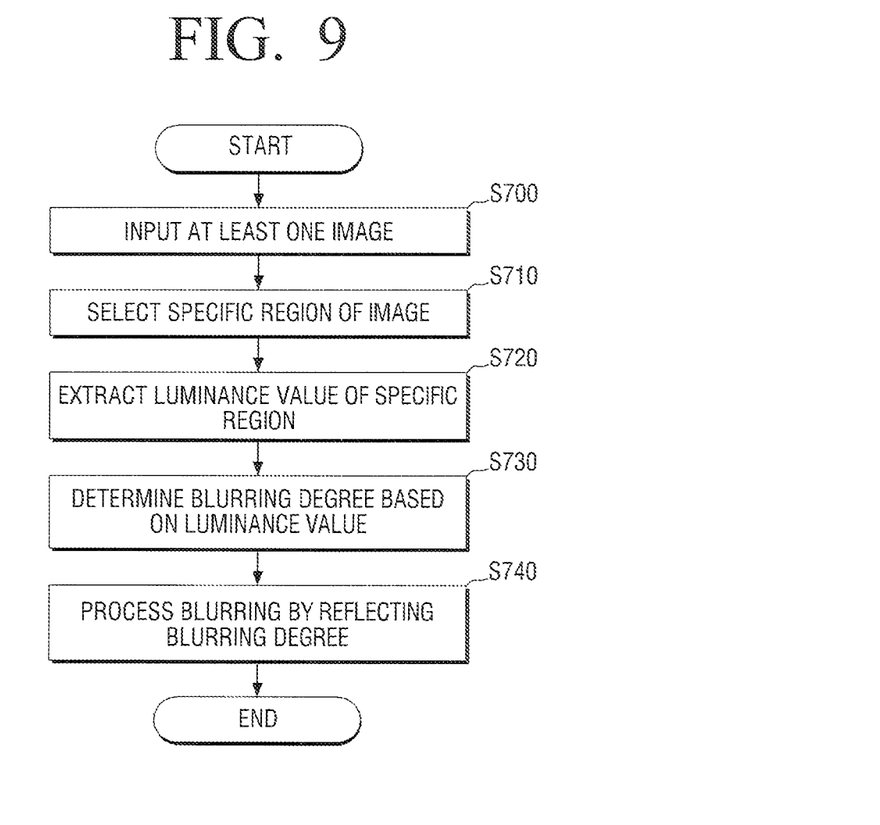
FIG. 9 illustrates a flowchart showing an image processing method according to an embodiment of the present invention era.

FIG. 9 illustrates a flowchart showing an image processing method according to an embodiment of the present invention. At least one image is input (S700) and a specific region in the input image, that is, a region in which image processing is to be performed is selected (S710). The region to be processed is selected by a user or by position information of a subject and distance information of a background within the image.

A luminance value of the selected region is extracted on a pixel by pixel basis to reflect the luminance value (S720). Herein, a luminance value of the entire region other than the selected region may be selected. Next, a blurring degree is determined based on the extracted luminance value (S730). If the extracted luminance value is large, the blurring degree is increased and if the extracted luminance value is small, the blurring degree is decreased so that the weight value according to the luminance value becomes a parameter to determine the blurring degree.

Finally, a blurring processing for each cell of the image is performed according to the determined blurring degree (S740).

According to the image processing method and the photography apparatus according to various embodiments of the present invention as described above, it is possible to realize more nature output focus.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. An image processing method, comprising:
    inputting at least one image;
    selecting a specific region of the at least one image input;
    extracting a luminance value of the selected specific region;

determining a blurring degree based on the extracted luminance value; and performing image processing by blurring the selected specific region using the determined blurring degree, wherein performing the image processing includes increasing a width of each of the bright portions of the selected specific region relatively more than a width of each of the dark portions of the selected specific region.

2. The image processing method according to claim 1, wherein the performing of image processing includes blurring the selected specific region based on a weight value related to the extracted luminance value.

3. The image processing method according to claim 1, wherein the performing of image processing includes blurring the selected specific region by increasing the blurring degree, when the extracted luminance value is large.

4. The image processing method according to claim 1, wherein the performing of image processing includes blurring the selected specific region by reducing the blurring degree, when the extracted luminance value is small.

5. The image processing method according to claim 1, wherein the performing of image processing includes processing the selected specific region so that the processed image satisfies the following equation:

$$\text{blur} = \frac{\frac{W_{white\text{-}ip}}{W_{black\text{-}ip}}}{\frac{W_{white}}{W_{black}}} > 1$$

where, $W_{white}$ denotes the width of each of the bright portions of an image before image processing in a contrast pattern graph, $W_{black}$ denotes the width of each of the dark portions of an image before image processing in the contrast pattern graph, $W_{white\text{-}ip}$ denotes a width of each of the bright portions of an image after image processing in the contrast pattern graph, and $W_{black\text{-}ip}$ denotes a width of each of the dark portions of an image after an image processing in the contrast pattern graph, wherein the contrast pattern graph is a graph showing an intensity of a contrast pattern.

6. The image processing method according to claim 1, wherein the selecting of the specific region includes selecting the specific region based on an input from a user.

7. The image processing method according to claim 1, wherein the selecting of the specific region includes selecting the specific region using position information of a subject or a distance information of a background within the input image.

8. The image processing method according to claim 1, further comprising displaying the processed image.

9. The image processing method according to claim 1, wherein the luminance value is defined as the following equation:

Luminance value=$a*R+b*G+c*B$ (herein, $a$, $b$, and $c$ are natural numbers and $R$, $G$ and $B$ are luminance values of color components of the at least one image).

10. The image processing method according to claim 1, wherein the at least one image includes a two dimensional (2D) image or a three dimensional (3D) image.

11. The image processing method according to claim 1, wherein the inputting of at least one image includes receiving an image generated from one or more camera modules.

12. A photography apparatus, comprising:

an image input unit which inputs at least one image; and an image processing unit which selects a specific region of the at least one image input, determines a blurring degree based on a luminance value of the selected specific region, and performs image processing by blurring the selected specific region using the determined blurring degree, wherein the image processing unit performs the image processing by increasing a width of each of the bright portions of the selected specific region relatively more than a width of each of the dark portions of the selected specific region.

13. The photography apparatus according to claim 12, wherein the image processing unit blurs the selected specific regions based on a weight value related to the luminance value.

14. The photography apparatus according to claim 12, wherein the image processing unit blurs the selected specific region by increasing the blurring degree, when the luminance value is large.

15. The photography apparatus according to claim 12, wherein the image processing unit blurs the selected specific region by reducing the blurring degree, when the luminance value is small.

16. The photography apparatus according to claim 12, wherein the image processing unit processes the selected specific region so that the processed image satisfies the following equation:

$$\text{blur} = \frac{\frac{W_{white\text{-}ip}}{W_{black\text{-}ip}}}{\frac{W_{white}}{W_{black}}} > 1$$

where, $W_{white}$ denotes the width of each of the bright portions of an image before image processing in a contrast pattern graph, $W_{black}$ denotes the width of each of the dark portions of an image before image processing in the contrast pattern graph, $W_{white\text{-}ip}$ denotes a width of each of the bright portions of an image after image processing in the contrast pattern graph, and $W_{black\text{-}ip}$ denotes a width of each of the dark portions of an image after image processing in the contrast pattern graph, wherein the contrast pattern graph is a graph showing an intensity of a contrast pattern.

17. The photography apparatus according to claim 12, wherein the image processing unit selects the specific region of the image via an input from a user and processes the selected specific region.

18. The photography apparatus according to claim 12, wherein the image processing unit selects the specific region using position information of a subject or distance information of a background within the image.

19. The photography apparatus according to claim 12, further comprising a display unit which displays the processed image.

20. The photography apparatus according to claim 12, wherein the luminance value is defined as the following equation:

Luminance value=$a*R+b*G+c*B$ (herein, $a$, $b$, and $c$ are natural numbers and $R$, $G$ and $B$ are luminance values of color components of the at least one image).

21. The photography apparatus according to claim 12, wherein the at least one image includes a two dimensional (2D) image or a three dimensional (3D) image.

22. The photography apparatus according to claim 12, wherein the image input unit receives an image generated from one or more camera modules.

* * * * *